(12) United States Patent
Shin et al.

(10) Patent No.: US 9,115,871 B2
(45) Date of Patent: Aug. 25, 2015

(54) BACKLIGHT ASSEMBLY AND DISPLAY APPARATUS HAVING THE SAME

(71) Applicant: Samsung Display Co., Ltd., Yongin, Gyeonggi-Do (KR)

(72) Inventors: Yong-sun Shin, Gumi-si (KR); Jinsoo Shin, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 249 days.

(21) Appl. No.: 13/764,608

(22) Filed: Feb. 11, 2013

(65) Prior Publication Data

US 2014/0049987 A1 Feb. 20, 2014

(30) Foreign Application Priority Data

Aug. 20, 2012 (KR) .......................... 10-2012-0090848

(51) Int. Cl.
| | |
|---|---|
| *G02B 6/00* | (2006.01) |
| *F21V 11/00* | (2015.01) |
| *G02F 1/1335* | (2006.01) |
| *F21V 8/00* | (2006.01) |
| *G02F 1/1333* | (2006.01) |

(52) U.S. Cl.
CPC .............. *F21V 11/00* (2013.01); *G02B 6/0068* (2013.01); *G02F 1/133512* (2013.01); *G02F 1/133603* (2013.01); *G02F 1/133611* (2013.01); *G02F 1/133615* (2013.01); *G02B 6/009* (2013.01); *G02F 2001/133317* (2013.01)

(58) Field of Classification Search
CPC .......... G02F 2001/133613; G02F 2001/13332; G02F 2001/133317; G02F 2001/133314; G02F 2001/133328; G02F 1/133; G02F 1/1333; G02B 6/0073; G02B 6/0068

USPC .............. 362/612, 613, 630–632, 97.1–97.4; 349/58–60
See application file for complete search history.

(56) References Cited

U.S. PATENT DOCUMENTS

| | | | |
|---|---|---|---|
| 5,513,028 A | 4/1996 | Sono et al. | |
| 7,994,695 B2 | 8/2011 | Collins et al. | |
| 8,081,271 B2 | 12/2011 | Kobayashi et al. | |
| 2004/0061440 A1* | 4/2004 | Imai et al. ..................... | 313/512 |
| 2004/0264212 A1 | 12/2004 | Chung et al. | |

(Continued)

FOREIGN PATENT DOCUMENTS

| | | |
|---|---|---|
| JP | 2006-189665 | 7/2006 |
| KR | 10-2006-0065377 | 6/2006 |

(Continued)

*Primary Examiner* — Peggy Neils
*Assistant Examiner* — Zheng Song
(74) *Attorney, Agent, or Firm* — Innovation Counsel LLP

(57) ABSTRACT

A backlight assembly includes first LED packages, second LED packages, a light guide plate, a printed circuit board, and a light blocking member. Each of the first LED packages emits light of a first color. Each of the second LED packages emits light of a second color different from the first color. The first and the second LED packages are provided in the same number and alternately arranged with each other. The light guide plate receives an incident light from the first and the second LED packages to output an emission light, and the first and second LED packages are mounted on the printed circuit board. In addition, the light blocking member blocks the light generated from one of the first LED packages, which is located at an outermost portion of the printed circuit board, and travelling to the light guide plate.

20 Claims, 7 Drawing Sheets

(56) References Cited

U.S. PATENT DOCUMENTS

| | | |
|---|---|---|
| 2008/0074382 A1 | 3/2008 | Lee et al. |
| 2008/0101093 A1* | 5/2008 | Yoon et al. .................... 362/630 |
| 2009/0129117 A1* | 5/2009 | Kim et al. ..................... 362/613 |
| 2010/0079059 A1* | 4/2010 | Roberts et al. ................ 313/503 |
| 2010/0277670 A1* | 11/2010 | Hamada .......................... 349/62 |
| 2012/0082126 A1 | 4/2012 | Kim et al. |
| 2012/0139445 A1* | 6/2012 | Fujiwara et al. ............. 315/294 |
| 2012/0293727 A1* | 11/2012 | Yoshikawa ................... 348/739 |
| 2013/0002987 A1* | 1/2013 | Sugiura .......................... 349/65 |
| 2013/0021821 A1* | 1/2013 | Yoon et al. .................... 362/612 |
| 2013/0135538 A1* | 5/2013 | Kuromizu ..................... 348/790 |
| 2014/0320785 A1* | 10/2014 | Hirohata et al. ................ 349/65 |

FOREIGN PATENT DOCUMENTS

| | | |
|---|---|---|
| KR | 10-2009-0002180 | 1/2009 |
| KR | 10-2010-0080094 | 7/2010 |
| KR | 10-2010-0121138 | 11/2010 |

\* cited by examiner

BACKLIGHT ASSEMBLY AND DISPLAY APPARATUS HAVING THE SAME

CROSS-REFERENCE TO RELATED APPLICATION

This U.S. non-provisional patent application claims priority under 35 U.S.C. §119 of Korean Patent Application No. 10-2012-0090848, filed on Aug. 20, 2012, the contents of which are hereby incorporated by reference.

BACKGROUND

1. Field of Disclosure

The present disclosure relates to a backlight assembly and a display apparatus having the same. More particularly, the present disclosure relates to a backlight assembly employing a light emitting diode package as its light source and a display apparatus having the backlight assembly.

2. Description of the Related Art

In general, a display apparatus, which is not self-emissive, e.g., a liquid crystal display, includes a backlight assembly that generates light and a display panel that displays an image using the light. The backlight assembly includes a light source that receives a source voltage from an external source and emits the light. As the light source, a cold cathode fluorescent lamp (CCFL) or a light emitting diode (LED) package is widely used. In recent years, the CCFL is replaced with the LED package since the LED package has advantages of low power consumption, high brightness, etc.

Meanwhile, in a case that the backlight assembly includes two or more LED packages generating different color lights and a printed circuit board on which the LED packages are mounted to realize a white light, a display quality of the display apparatus depends on the arrangement of the LED packages on the printed circuit board. For instance, as a distance between the LED packages increases, a color stain occurs since the different color lights are not sufficiently mixed with each other. In addition, when the LED packages, which generate the light in a specific color, are arranged to correspond to an edge portion of a display area of the display panel, a dark area appears in the edge portion.

SUMMARY

The present disclosure provides a backlight assembly capable of generating light having a uniform brightness and a uniform color.

The present disclosure provides a display apparatus having the backlight assembly to improve its display quality.

Embodiments of the inventive concept provide a backlight assembly includes first light emitting diode packages, second light emitting diode packages, a light guide plate, a printed circuit board, and a light blocking member. The first light emitting diode packages emit light of a first color. The second light emitting diode packages emit light of a second color different from the first color, and the second light emitting diode packages are provided in a same number as a number of the first light emitting diode packages and alternately arranged with the first light emitting diode packages.

The light guide plate receives an incident light from the first light emitting diode packages and the second light emitting diode packages to output an emission light. The first light emitting diode packages and the second light emitting diode packages are mounted on the printed circuit board. The light blocking member blocks light emitted from any one of the first light emitting diode packages, which is located at an outermost portion of the printed circuit board, and traveling to the light guide plate.

Embodiments of the inventive concept provide a display apparatus includes a backlight assembly and a display panel displaying an image. The backlight assembly includes first light emitting diode packages, second light emitting diode packages, a light guide plate, a printed circuit board, and a light blocking member. The first light emitting diode packages emit light of a first color. The second light emitting diode packages emit light of a second color different from the first color, and the second light emitting diode packages are provided in a same number as a number of the first light emitting diode packages and alternately arranged with the first light emitting diode packages.

The light guide plate receives an incident light from the first light emitting diode packages and the second light emitting diode packages to output an emission light. The first light emitting diode packages and the second light emitting diode packages are mounted on the printed circuit board. The light blocking member blocks light emitted from any one of the first light emitting diode packages, which is located at an outermost portion of the printed circuit board, and traveling to the light guide plate.

Embodiments of the inventive concept provide a backlight assembly may include first light emitting diode packages each emitting light of a first color; second light emitting diode packages each emitting light of a second color different from the first color, a number of the second light emitting diode packages being a same number as a number of the first light emitting diode packages, and the second light emitting diode packages being alternately arranged with the first light emitting diode packages; a light guide plate that receives an incident light from the first light emitting diode packages and the second light emitting diode packages to output an emission light; a printed circuit board on which the first light emitting diode packages and the second light emitting diode packages are mounted; and a light blocking member that blocks light emitted from the first light emitting diode package located at the printed circuit board corresponding to a peripheral area of a display panel.

Embodiments of the inventive concept provide a display apparatus includes a backlight assembly; and a display panel displaying an image, the backlight assembly may includes first light emitting diode packages each emitting light of a first color; second light emitting diode packages each emitting light of a second color different from the first color, a number of the second light emitting diode packages being a same number as a number of the first light emitting diode packages, and the second light emitting diode packages being alternately arranged with the first light emitting diode packages; a light guide plate receiving an incident light from the first light emitting diode packages and the second light emitting diode packages to output an emission light; a printed circuit board on which the first light emitting diode packages and the second light emitting diode package are mounted; and a light blocking member blocking light emitted from the first light emitting diode package located at the printed circuit board corresponding to a peripheral area of the display panel.

The display panel may include a display area displaying the image and a peripheral area surrounding the display area, the peripheral area corresponds to an area where the dummy light emitting diode package is disposed, and the display area corresponds to an area where the first light emitting diode packages are alternately arranged with the second light emitting diode packages except for the dummy light emitting diode package.

Light emitted from the first light emitting diode packages except the first light emitting diode package which is blocked by the light blocking member and the second light emitting diode packages may be provided to the light guide plate.

A color of the emission light may be white obtained by mixing the first color and the second color.

The first color may be green and the second color may be magenta.

The first light emitting diode package which is blocked by the light blocking member may serve as a dummy light emitting diode package, the dummy light emitting diode package may be spaced apart from one of the second light emitting diode packages next to the dummy light emitting diode package with a first interval, and the first light emitting diode packages except for the dummy light emitting diode package and the second light emitting diode packages, which are alternately arranged with each other, may be spaced apart from each other with a second interval smaller than the first interval.

The backlight assembly may further include a receiving container accommodating the light guide plate, the first light emitting diode packages and the second light emitting diode packages; and a mold frame fixing the light guide plate to the receiving container. The light blocking member may extend from the mold frame and be disposed between the light guide plate and the dummy light emitting diode package.

The backlight assembly may further includes a receiving container accommodating the light guide plate and the first and second light emitting diode packages; and a mold frame fixing the light guide plate to the receiving container. The light blocking member may extend from the receiving container and be disposed between the light guide plate and the dummy light emitting diode package.

The light blocking member may be a light blocking material attached to a light emitting surface of the dummy light emitting diode package.

The backlight assembly may further includes a connector mounted on the printed circuit board and including a plurality of power supply terminals. The first light emitting diode packages may be divided into a plurality of first groups each including a first number of the first light emitting diode packages (the first number is a natural number larger than two) and the second light emitting diode packages may be divided into a plurality of second groups each including a second number of the second light emitting diode packages (the second number is a natural number larger than two). The printed circuit board may includes a first printed circuit that electrically connects the first number of the first light emitting diode packages included in one of the first groups to any one of the power supply terminals in parallel; and a second printed circuit that electrically connects the second number of the second light emitting diode packages included in one of the second groups to another one of the power supply terminals in parallel.

According to the above, the backlight assembly emits the light having the uniform brightness and color. Accordingly, a display quality of the display apparatus employing the backlight assembly as its light source is improved, and thus color stains and dark areas may be prevented from appearing in the display area of the display apparatus.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION

Figure 1:
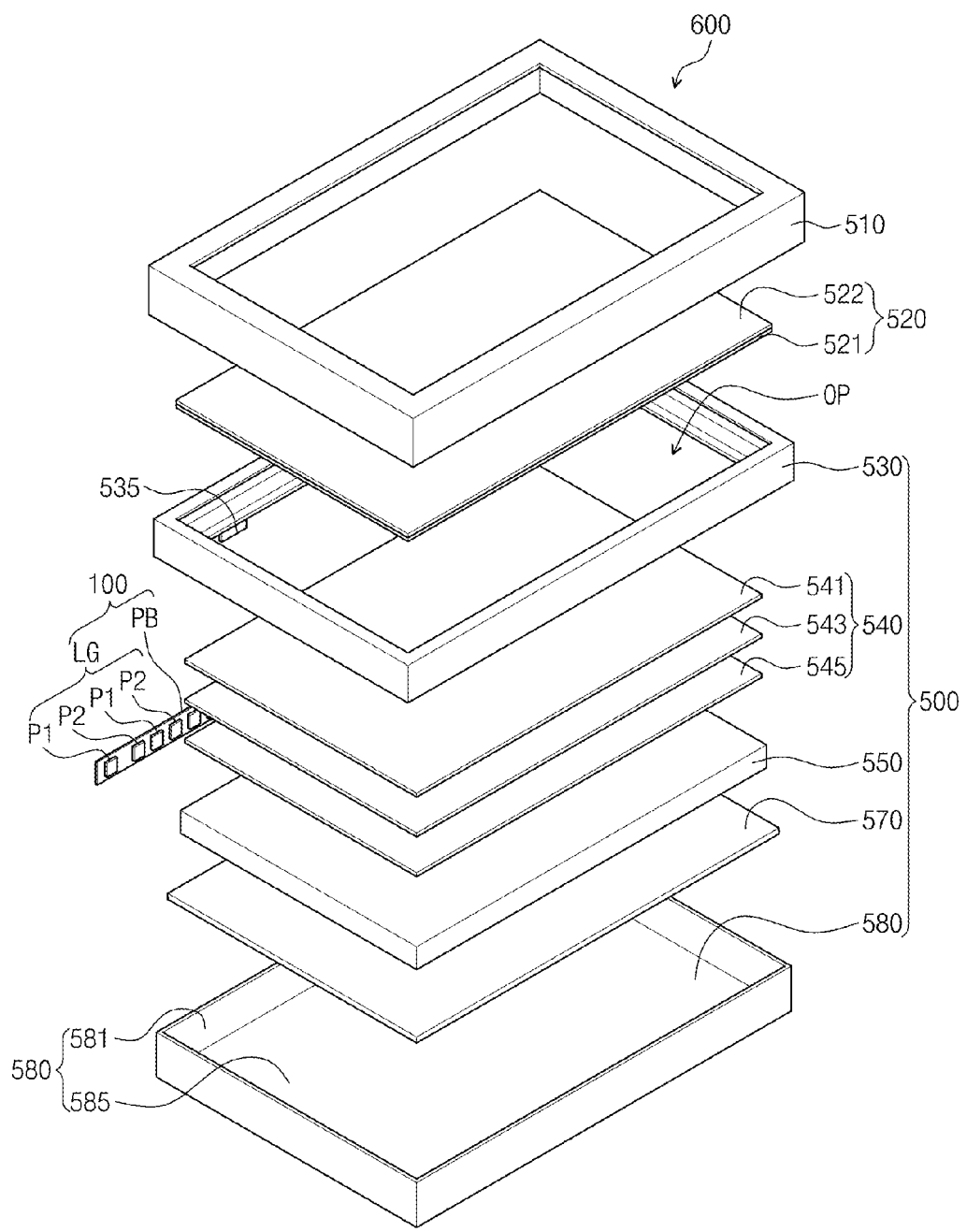
FIG. 1 is an exploded perspective view showing a display apparatus according to an exemplary embodiment of the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
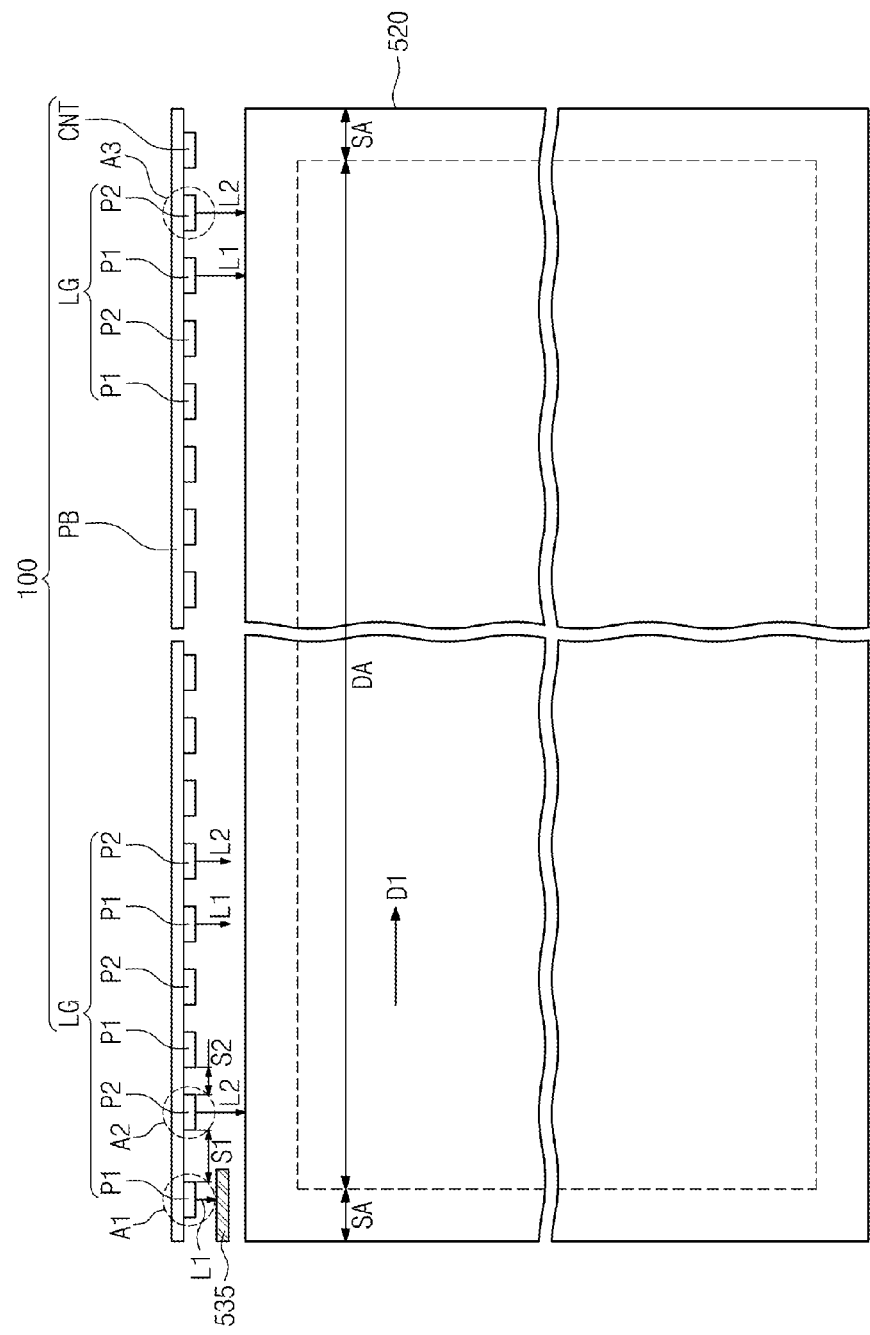
FIG. 2 is a plan view showing an arrangement relation between a display panel and LED packages shown in FIG. 1.

FIG. 1 is an exploded perspective view showing a display apparatus according to an exemplary embodiment of the present invention and FIG. 2 is a plan view showing an arrangement relation between a display panel and light emitting diode (LED) packages shown in FIG. 1.

Referring to FIGS. 1 and 2, a display apparatus 600 includes a backlight assembly 500 and a display panel 520. The backlight assembly 500 generates an emission light ET (refer to FIG. 3), and the display panel 520 receives the emission light from the backlight assembly 500 to display an image.

In the present exemplary embodiment, the display panel 520 may be, but not limited to, a liquid crystal display panel. In this case, the display panel 520 includes a first substrate 521 including a plurality of pixel electrodes, a second substrate 522 including a common electrode, and a liquid crystal layer (not shown) interposed between the first substrate 521 and the second substrate 522. According to another exemplary embodiment, the display panel 520 may be, but not limited to, an electrowetting display panel. In this case, the display panel 520 includes a fluid layer (not shown) interposed between the first substrate 521 and the second substrate 522 instead of the liquid crystal layer. The fluid layer includes two fluids that are immiscible with each other, and one of the two fluids has an electrical polarity.

The backlight assembly 500 includes a receiving container 580, a reflection plate 570, a light guide plate 550, a mold frame 530, a plurality of sheets 540, a light blocking member 535, a light emitting unit 100, and a cover member 510.

The receiving container 580 includes a bottom portion 585 and a plurality of sidewalls 581 extended from the bottom portion 585 to accommodate elements of the backlight assembly 500 therein. In the present exemplary embodiment, the light emitting unit 100 is disposed on an inner lateral surface of one of the sidewalls 581, but it should not be limited thereto or thereby. That is, when the light emitting unit 100 is provided in a plural number, an additional light emitting unit is disposed on another sidewall among the sidewalls 581.

The light guide plate 550 is accommodated in the receiving container 580 to allow a side portion of the light guide plate 550 to face the light emitting unit 100. Thus, the light emitted from first LED packages P1 and second LED packages P2 of the light emitting unit 100 is incident on the light guide plate 550 through the side portion of the light guide plate 550, and the emission light ET exiting from the light guide plate 550 travels to the display panel 520.

The reflection plate 570 includes a material that reflects the light, such as, polyethylene terephthalate (PET), aluminum, etc., and is disposed between the bottom portion 585 of the receiving container 580 and the light guide plate 550. Thus, the light, which is generated from the light emitting unit 100 and fails to be incident to the light guide plate 550, is incident on the light guide plate 550 again after being reflected by the reflection plate 570.

The mold frame 530 is coupled to the receiving container 580 to fix an edge of the light guide plate 550 to the bottom portion 585 of the receiving container 580. A portion of the mold frame 530 is extended in a direction substantially in parallel to the bottom portion 585, and thus the sheets 540 and the display panel 520 are seated on the portion of the mold frame 530.

The sheets 540 are disposed under the display panel 520. The sheets 540 include optical sheets to control a path of the light exiting from the light guide plate 550 and incident on the display panel 520 and a protection sheet to protect a surface of the display panel 520. In the present exemplary embodiment, the sheets 540 include a protection sheet 541 protecting a rear surface of the display panel 520, a prism sheet 543 improving a front brightness, and a diffusion sheet 545 diffusing the light.

The light blocking member 535 blocks light that travels to the light guide plate 550 after being generated from one of LED packages LG, which is disposed at an outermost portion of a printed circuit board PB. In the present exemplary embodiment, the LED packages LG include the first LED packages P1 and the second LED packages P2, which are alternately arranged with each other. Each of the first LED packages P1 generates a first light L1 with a first color, and each of the second LED packages P2 generates a second light L2 with a second color that is different from the first color. In this case, the light blocking member 535 blocks the light generated from one of the first LED package P1, which is disposed at the outermost portion of the printed circuit board PB and having the first color. The light blocking member 535 will be described in detail with reference to FIG. 3 and FIG. 4 later.

The light emitting unit 100 generates the light required to display the image on the display panel 520. The light emitting unit 100 includes the printed circuit board PB, the LED packages LG, and a connector CNT. The LED packages LG and the connector CNT are mounted on the printed circuit board PB, and thus the LED packages LG generate the light using a source voltage applied through an external power supply unit (not shown) that is electrically connected to the connector CNT.

The LED packages LG include the first LED packages P1 and the second LED packages P2. Each of the first LED packages P1 generates the first light L1 and each of the second LED packages P2 generates the second light L2 having a different color from that of the first light L1. The first color and the second color are determined such that the color of the emission light, which is obtained by mixing the first color with the second color, becomes white.

In the present exemplary embodiment, the first color is green and the second color is magenta. In this case, the first color and the second color are mixed with each other to allow the color of the emission light to be white. However, the first color and the second color should not be limited to green and magenta, respectively. That is, the first color and the second color may be other than green and magenta as long as the color obtained by mixing the first and second colors is white.

In the present exemplary embodiment, the number of the first LED packages P1 mounted on the printed circuit board PB is the same as the number of the second LED packages P2 mounted on the printed circuit board PB. For instance, in case that the display panel 520 has a size of about twenty-four inches, the number of the first LED packages P1 is thirty-six and the number of the second LED packages P2 is thirty-six.

In addition, the first LED packages P1 are alternately arranged with the second LED packages P2. In case that any one of the first LED packages P1 is disposed in a first area A1, which is the outermost portion of the printed circuit board PB, among areas in which the first LED packages P1 are alternately arranged with the second LED packages P2, any one of the second LED packages P2 is disposed in a third area A3, which is the other outermost portion of the printed circuit board PB and opposite to the first area A1.

Hereinafter, for the convenience of explanation, the one of the first LED packages P1 disposed in the first area A1 is referred to as a dummy LED package, one of the second LED packages P2 disposed in a second area A2 next to the first area A1 is referred to as a first side LED package, and the one of the second LED packages P2 disposed in the third area A3 is referred to as a second side LED package. In this case, the dummy LED package generates the first light L1, and the first and second side LED packages generate the second light L2.

Meanwhile, the dummy LED package generates the first light L1 as described above, however, the first light L1 generated from the dummy LED package and traveling to the light guide plate 550 is blocked by the light blocking member 535. Thus, among the LED packages LG except for the dummy LED package, the light generated from the other LED packages, which are sequentially arranged between the first side LED package and the second side LED package along a first direction D1, is provided to the light guide plate 550. That is, in case that the number of the first LED packages P1 and the number of the second LED packages P2 are "m" (m is a natural number), the light generated from m−1 first LED packages P1 is provided to the light guide plate 550, and the light generated from m second LED packages P2 is provided to the light guide plate 550.

As shown in FIG. 2, the dummy LED package is spaced apart from the first side LED package adjacent to the dummy LED package with a first interval S1 and remaining LED packages among the LED packages LG except for the dummy LED package are spaced apart from each other with a second interval S2. The first interval S1 is greater than the second interval S2. In the present exemplary embodiment, since the display panel 520 has the size of about twenty-four inches, the number of the first LED packages P1 is thirty-six, and the number of the second LED packages P2 is thirty-six, a minimum value of the first interval S1 is about 6.1 mm and the second interval S2 is in a range from about 1 mm to about 2 mm.

As described above, when the first interval S1 is greater than the second interval S2, a blocking effect of the first light L1, which is generated from the dummy LED package and travels to the light guide plate 550, by using the blocking member 535 may be improved. Meanwhile, as the first interval S1 becomes larger than about 6.1 mm, a distance between the dummy LED package and the light guide plate 550 becomes longer, thereby improving the blocking effect against the first light L1. In this case, however, a volume of the receiving container 580 accommodating the light emitting unit 100 therein is increased. Therefore, the first interval S1 is required to be set to a range from about 5.5 mm to about 8.0 mm.

The arrangement relation between the display panel 520 and the LED packages LG is as follows. The display panel 520 includes a display area DA in which an image is displayed and a peripheral area SA surrounding the display area DA. In the present exemplary embodiment, the peripheral area SA corresponds to the areas where the dummy LED package and the connector CNT are respectively disposed, and the display area DA corresponds to the area where the LED packages LG, except for the dummy LED package, are disposed.

Meanwhile, according to the definition of the first and second side LED packages, the first side LED package and the second side LED package are included in the second LED packages P2, and thus, the first side LED package and the second side LED package generate the second light L2. Therefore, when the first light L1 and the second light L2 are green and magenta, respectively, the first side LED package and the second side LED package that emit magenta light are disposed to correspond to both ends of the display area DA.

Accordingly, in the case that the first LED packages P1 that emit green light are disposed on an area correspond to at least one end of the display area DA, a color stain or a dark area darker than surrounding areas may appear. In the present exemplary embodiment, however, the first side LED package and the second side LED package that emit the second light L2, i.e., magenta light, are disposed at both ends of the display area DA, respectively, so that the color stain or the dark area may be prevented from appearing in the display area DA.

The cover member 510 is partially opened to expose the display area DA of the display panel 520 and coupled to the receiving container 580 to cover an edge of the display panel 520. Accordingly, the elements of the backlight assembly 500 may be stably accommodated in the receiving container 580.

Figure 3:
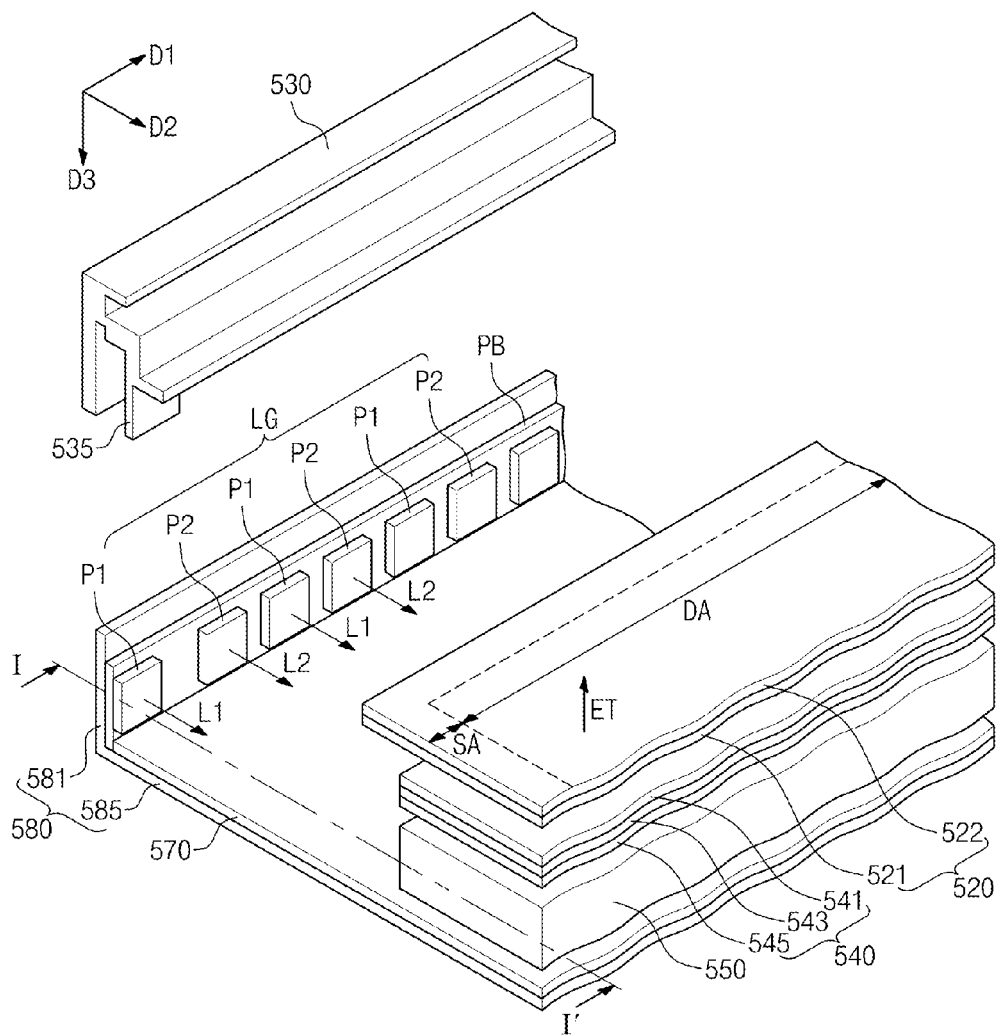
FIG. 3 is an exploded perspective view showing a coupling relation between elements of a backlight assembly shown in FIG. 1.
Figure 4:
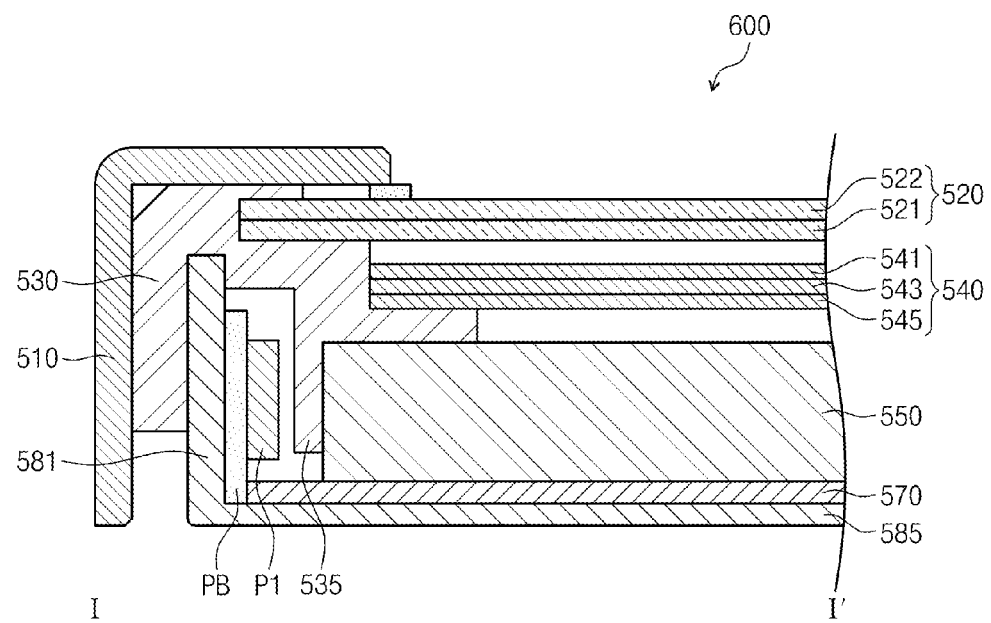
FIG. 4 is a cross-sectional view taken along a line I-I' of FIG. 3.

FIG. 3 is an exploded perspective view showing a coupling relation of elements in the backlight assembly of FIG. 1, and FIG. 4 is a cross-sectional view taken along a line I-I' of FIG. 3.

Referring to FIGS. 3 and 4, an opening OP shown in FIG. 1 is formed through the mold frame 530 to expose the display area DA of the display panel 520, and the mold frame 530 extends in the first direction D1 and a second direction D2 substantially perpendicular to the first direction D1 to have a frame shape, and thus fixes an edge of the light guide plate 550 to the receiving container 580.

In the present exemplary embodiment shown in FIGS. 3 and 4, the light blocking member 535 extends from the mold frame 530. In this case, the light blocking member 535 is formed on a rear surface or a side surface of the mold frame 530 and extends in a third direction D3 that is substantially perpendicular to the first and second directions D1 and D2. Thus, when the mold frame 530 is seated on the sidewall 581 of the receiving container 580, the light blocking member 535 covers the first LED package P1 located at the outermost portion of the LED packages LG. The light blocking member 535 may be formed of a same material to the mold frame 530, or be formed of a different material than the mold frame 530 and be coupled to the mold frame 530.

As described with reference to FIG. 1 and FIG. 2, the first LED package P1 located at the outermost portion of the LED packages LG serves as the dummy LED package. Therefore, the first light L1 emitted from the dummy LED package is blocked by the light blocking member 535 and fails to be incident on the light guide plate 550.

Figure 5:
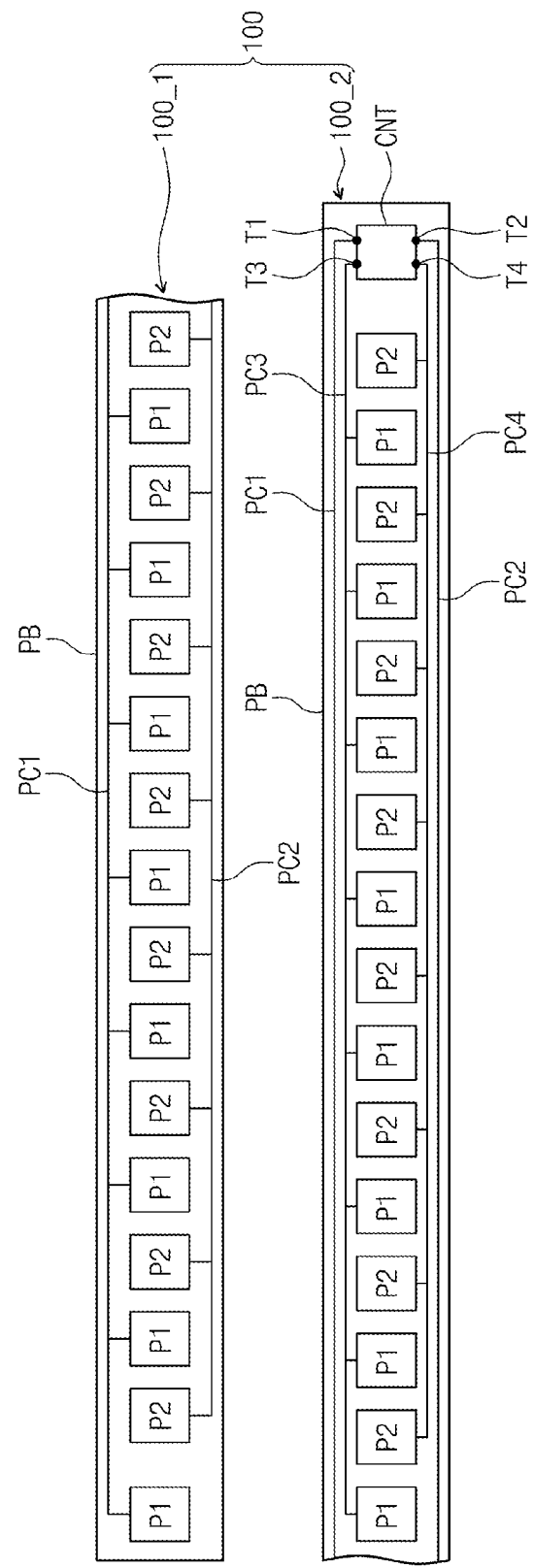
FIG. 5 is a plan view showing a circuit configuration of a printed circuit board of a light emitting unit shown in FIG. 2.

FIG. 5 is a diagram showing a circuit configuration of the printed circuit board of the light emitting unit shown in FIG. 2. FIG. 5 shows the light emitting unit 100 divided into a first portion 100_1 and a second portion 100_2, but the first portion 100_1 and the second portion 100_2 are successively connected to each other.

Referring to FIG. 5, the light emitting unit 100 includes the printed circuit board PB, the connector CNT mounted on the printed circuit board PB, the first LED packages P1, and the second LED packages P2. Also, the printed circuit board PB includes a first printed circuit PC1, a second printed circuit PC2, a third printed circuit PC3, and a fourth printed circuit PC4.

The first LED packages P1 are divided into a plurality of groups, and the first LED packages P1 corresponding to each group are electrically connected to each other in parallel.

More particularly, eight first LED packages P1 are arranged in the first portion 100_1, and eight first LED packages P1 are arranged in the second portion 100_2. When the eight first LED packages P1 arranged in the first portion 100_1 are referred to as a first group and the eight first LED packages P1 arranged in the second portion 100_2 are referred to as a second group, the first LED packages P1 corresponding to the first group are electrically connected to a first power supply terminal T1 of the connector CNT in parallel by the first printed circuit PC1, and the first LED packages P1 corresponding to the second group are electrically connected to a third power supply terminal T3 of the connector CNT in parallel by the third printed circuit PC3.

Thus, in case that the same current is applied to the first and the third power supply terminals T1 and T3, the eight first LED packages P1 corresponding to the first group and the eight first LED packages P1 corresponding to the second group receive the same current, so that the sixteen first LED packages P1 corresponding to the first and the second groups may emit light having substantially the same brightness.

Similar to the sixteen first LED packages P1 electrically connected to the connector CNT by the first printed circuit PC1 and the third printed circuit PC3, eight second LED packages P2 among sixteen second LED packages P2 shown in FIG. 5 are electrically connected to a second power supply terminal T2 in parallel by the second printed circuit PC2, and the other eight second LED packages P2 among the sixteen second LED packages P2 are electrically connected to a fourth power supply terminal T4 in parallel by the fourth printed circuit PC4. Therefore, when the same current is applied to the second power supply terminal T2 and the fourth power supply terminal T4, the sixteen second LED packages P2 may emit light having substantially the same brightness.

In the present exemplary embodiment shown in FIG. 5, the sixteen first LED packages P1 and the sixteen second LED packages P2 are electrically connected to the connector CNT, but the number of the first and the second LED packages P1 and P2 should not be limited thereto or thereby. For instance, the number of the first LED packages P1 and the number of the second LED packages P2 may increase to be a multiple of 8, e.g., twenty-four or thirty-two, and thus additional printed circuits corresponding to the increased number of the first and the second LED packages P1 and P2 may be further disposed on the printed circuit board PB.

Figure 6:
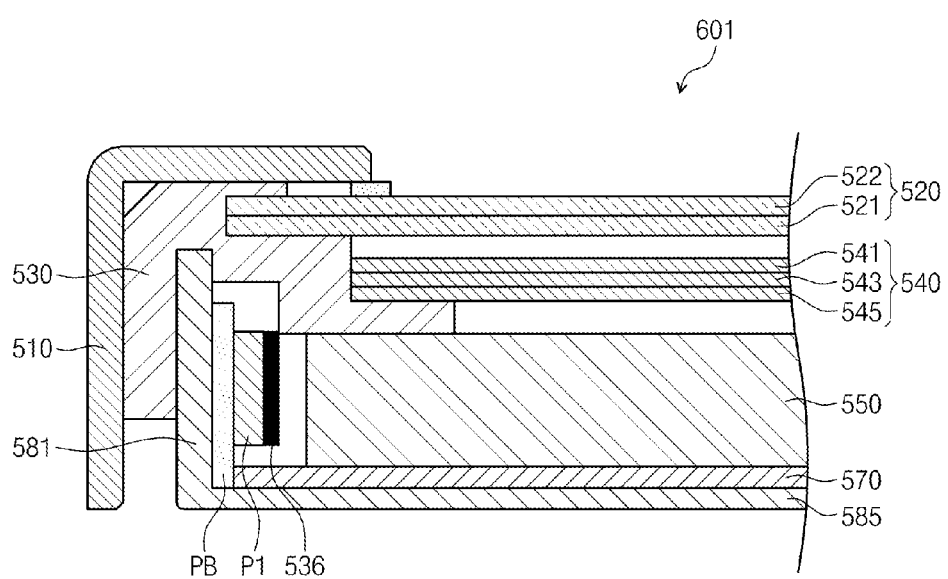
FIG. 6 is a cross-sectional view showing a display apparatus according to another exemplary embodiment of the present invention.

FIG. 6 is a cross-sectional view showing a display apparatus according to another exemplary embodiment of the present invention.

The display apparatus 601 shown in FIG. 6 has the same elements as those of the display apparatus 600 described with reference to FIGS. 1 to 5 except for a light blocking member 536. Accordingly, in FIG. 6, the same reference numerals denote the same elements in FIGS. 1 to 5, and thus detailed descriptions of the same elements will be omitted.

The light blocking member 536 may be, but not limited to, a light blocking tape to which an adhesive material is applied. In this case, the light blocking member 536 is attached to a light emitting surface of a dummy LED package among first LED packages P1, which is located at the outermost portion of the display panel, as described with reference to FIGS. 1 and 2. Thus, the light emitted from the dummy LED package and traveling to the light guide plate 550 is blocked by the light blocking member 536.

Figure 7:
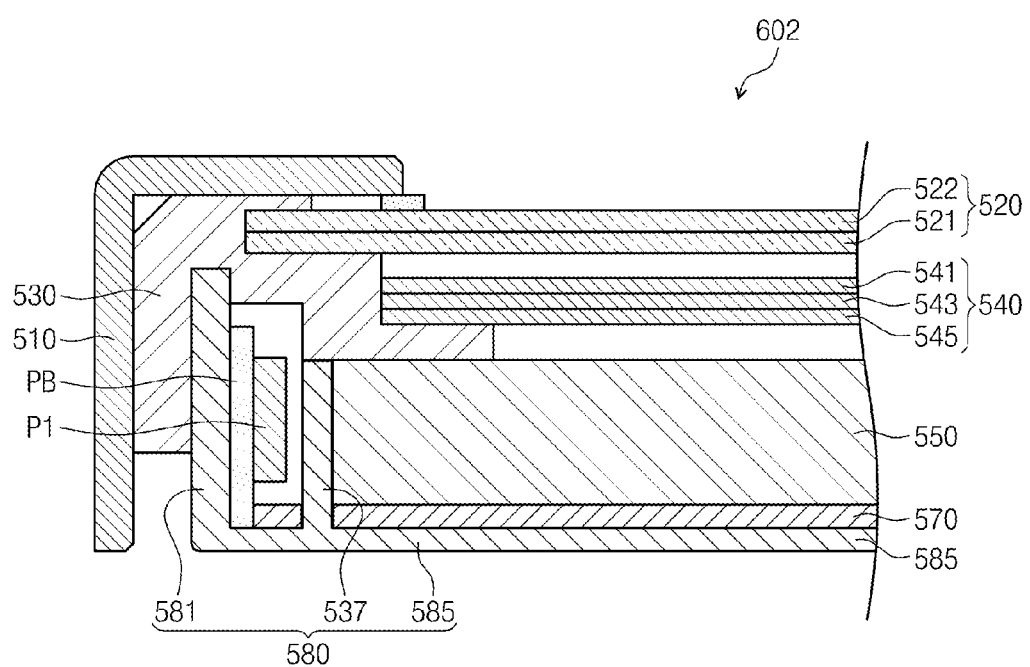
FIG. 7 is a cross-sectional view showing a display apparatus according to another exemplary embodiment of the present invention.

FIG. 7 is a cross-sectional view showing a display apparatus according to another exemplary embodiment of the present invention.

The display apparatus 602 shown in FIG. 7 has the same elements as those of the display apparatus 600 described with reference to FIGS. 1 to 5 except for a light blocking member 537. Accordingly, in FIG. 7, the same reference numerals denote the same elements in FIGS. 1 to 5, and thus detailed descriptions of the same elements will be omitted.

The light blocking member 537 may extend from the bottom portion 585 of the receiving container 580. Accordingly, the light blocking member 537 is disposed between the dummy LED package located at the outermost portion and the light guide plate 550 as described with reference to FIGS. 1 and 2. As a result, the light emitted from the dummy LED package and traveling to the light guide plate 550 is blocked by the light blocking member 537.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
   first light emitting diode packages each emitting light of a first color;
   second light emitting diode packages each emitting light of a second color different from the first color, a number of the second light emitting diode packages being a same number as a number of the first light emitting diode packages, and the second light emitting diode packages being alternately arranged with the first light emitting diode packages;
   a light guide plate that receives an incident light from the first light emitting diode packages and the second light emitting diode packages to output an emission light;
   a printed circuit board on which the first light emitting diode packages and the second light emitting diode packages are mounted; and
   a light blocking member that blocks light emitted from any one of the first light emitting diode packages, which is located at only one of two outermost portions of the printed circuit board, and traveling to the light guide plate.

2. The backlight assembly of claim 1, wherein light emitted from the first light emitting diode packages except the first light emitting diode package which is blocked by the light blocking member and the second light emitting diode packages are provided to the light guide plate.

3. The backlight assembly of claim 1, wherein a color of the emission light is white obtained by mixing the first color and the second color.

4. The backlight assembly of claim 3, wherein the first color is green and the second color is magenta.

5. The backlight assembly of claim 1, wherein the any one of the first light emitting diode packages located at the outermost portion and blocked by the light blocking member serves as a dummy light emitting diode package, the dummy light emitting diode package is spaced apart from one of the second light emitting diode packages next to the dummy light emitting diode package with a first interval, and the first light emitting diode packages except for the dummy light emitting diode package and the second light emitting diode packages, which are alternately arranged with each other, are spaced apart from each other with a second interval smaller than the first interval.

6. The backlight assembly of claim 5, further comprising:
   a receiving container accommodating the light guide plate, the first light emitting diode packages and the second light emitting diode packages; and a mold frame fixing the light guide plate to the receiving container,
wherein the light blocking member extends from the mold frame and is disposed between the light guide plate and the dummy light emitting diode package.

7. The backlight assembly of claim 5, further comprising:
a receiving container accommodating the light guide plate and the first and second light emitting diode packages; and
a mold frame fixing the light guide plate to the receiving container,
wherein the light blocking member extends from the receiving container and is disposed between the light guide plate and the dummy light emitting diode package.

8. The backlight assembly of claim 5, wherein the light blocking member is a light blocking material attached to a light emitting surface of the dummy light emitting diode package.

9. The backlight assembly of claim 1, further comprising:
a connector mounted on the printed circuit board and including a plurality of power supply terminals,
wherein the first light emitting diode packages are divided into a plurality of first groups each including a first number of the first light emitting diode packages (the first number is a natural number larger than two) and the second light emitting diode packages are divided into a plurality of second groups each including a second number of the second light emitting diode packages (the second number is a natural number larger than two), the printed circuit board comprises:
a first printed circuit that electrically connects the first number of the first light emitting diode packages included in one of the first groups to any one of the power supply terminals in parallel; and
a second printed circuit that electrically connects the second number of the second light emitting diode packages included in one of the second groups to another one of the power supply terminals in parallel.

10. A display apparatus comprising:
a backlight assembly; and
a display panel displaying an image, the backlight assembly comprising:
first light emitting diode packages each emitting light of a first color;
second light emitting diode packages each emitting light of a second color different from the first color, a number of the second light emitting diode packages being a same number as a number of the first light emitting diode packages, and the second light emitting diode packages being alternately arranged with the first light emitting diode packages;
a light guide plate receiving an incident light from the first light emitting diode packages and the second light emitting diode packages to output an emission light;
a printed circuit board on which the first light emitting diode packages and the second light emitting diode package are mounted; and
a light blocking member blocking light emitted from the first light emitting diode packages located at only one of two outmost portions of the printed circuit board corresponding to a peripheral area of the display panel.

11. The display apparatus of claim 10, wherein the light emitted from the first light emitting diode packages except the first light emitting diode package which is blocked by the light blocking member and the second light emitting diode packages are provided to the light guide plate.

12. The display apparatus of claim 10, wherein a color of the emission light is white obtained by mixing the first color and the second color.

13. The display apparatus of claim 12, wherein the first color is green and the second color is magenta.

14. The display apparatus of claim 13, wherein the first light emitting diode packages which is blocked by the light blocking member serves as a dummy light emitting diode package, the dummy light emitting diode package is spaced apart from one of the second light emitting diode packages next to the dummy light emitting diode package with a first interval, and the first light emitting diode packages except for the dummy light emitting diode package and the second light emitting diode packages, which are alternately arranged with each other, are spaced apart from each other with a second interval smaller than the first interval.

15. The display apparatus of claim 14, wherein the display panel comprises a display area displaying the image, the peripheral area surrounds the display area and corresponds to an area where the dummy light emitting diode package is disposed, and the display area corresponds to an area where the first light emitting diode packages are alternately arranged with the second light emitting diode packages except for the dummy light emitting diode package.

16. The display apparatus of claim 14, further comprising:
a receiving container accommodating the light guide plate, the first light emitting diode packages and the second light emitting diode packages; and
a mold frame fixing the light guide plate to the receiving container,
wherein the light blocking member extends from the mold frame and disposed between the light guide plate and the dummy light emitting diode package.

17. The display apparatus of claim 14, further comprising:
a receiving container accommodating the light guide plate, the first light emitting diode packages and the second light emitting diode packages; and
a mold frame fixing the light guide plate to the receiving container,
wherein the light blocking member extends from the receiving container and disposed between the light guide plate and the dummy light emitting diode package.

18. The display apparatus of claim 14, wherein the light blocking member is a light blocking material attached to a light emitting surface of the dummy light emitting diode package.

19. The display apparatus of claim 10, further comprising:
a connector mounted on the printed circuit board and including a plurality of power supply terminals,
wherein the first light emitting diode packages are divided into a plurality of first groups each including a first number of the first light emitting diode packages (the first number is a natural number larger than two) and the second light emitting diode packages are divided into a plurality of second groups each including a second number of the second light emitting diode packages (the second number is a natural number larger than two), the printed circuit board comprises:
a first printed circuit that electrically connects the first number of the first light emitting diode packages included in one of the first groups to any one of the power supply terminals in parallel; and
a second printed circuit that electrically connects the second number of the second light emitting diode packages included in one of the second groups to another one of the power supply terminals in parallel.

20. The backlight assembly of claim 1, wherein the first light emitting diode packages emit green light.

* * * * *